United States Patent [19]
Davis et al.

[11] Patent Number: 5,101,799
[45] Date of Patent: Apr. 7, 1992

[54] MIXTURE CONTROL UNIT FOR USE WITH THE CONTROL SYSTEM OF A SOIL VENTING APPARATUS

[75] Inventors: Thomas L. Davis; Richard Baverstock, both of Long Beach; Don Bass, Downey, all of Calif.

[73] Assignee: VR Systems, Inc., Anaheim, Calif.

[21] Appl. No.: 743,873

[22] Filed: Aug. 12, 1991

Related U.S. Application Data

[62] Division of Ser. No. 512,305, Apr. 20, 1990, Pat. No. 5,070,850.

[51] Int. Cl.$^5$ ............................................. F02B 43/00
[52] U.S. Cl. .................................... 123/527; 123/575; 48/184
[58] Field of Search ...................... 123/527, 575, 531; 137/606, 607, 907; 48/184

[56] References Cited

U.S. PATENT DOCUMENTS

| | | | |
|---|---|---|---|
| 3,184,295 | 5/1965 | Baverstock | 48/184 |
| 4,413,607 | 11/1983 | Batchelor et al. | 123/527 |
| 4,453,523 | 6/1984 | Poehlman | 123/527 |
| 4,492,207 | 1/1985 | Hallberg | 123/527 |
| 4,508,134 | 4/1985 | Kelly et al. | 137/907 |
| 4,638,777 | 1/1987 | Fanner et al. | 123/527 |
| 4,813,394 | 3/1989 | St. Clair | 123/527 |
| 4,846,134 | 7/1989 | Perry et al. | 123/520 |
| 4,858,583 | 8/1989 | Sonntag | 123/527 |

FOREIGN PATENT DOCUMENTS 8202926 9/1982 World Int. Prop. O. ............ 48/184

Primary Examiner—E. Rollins Cross
Assistant Examiner—Erick Solis
Attorney, Agent, or Firm—Christie, Parker & Hale

[57] ABSTRACT

The invention provides a mixture control system for controlling the flow of vaporized hydrocarbons drawn into an engine for combustion and combining a supplemental fuel with the vaporized hydrocarbons as required to maintain a near stoichiometric mixture.

2 Claims, 3 Drawing Sheets

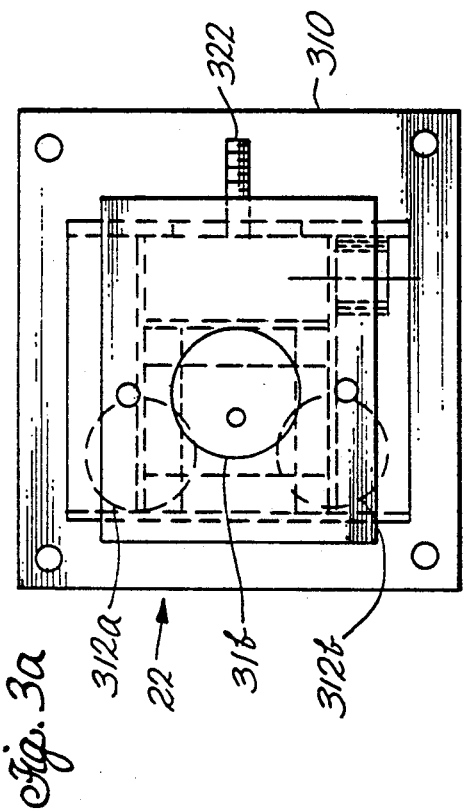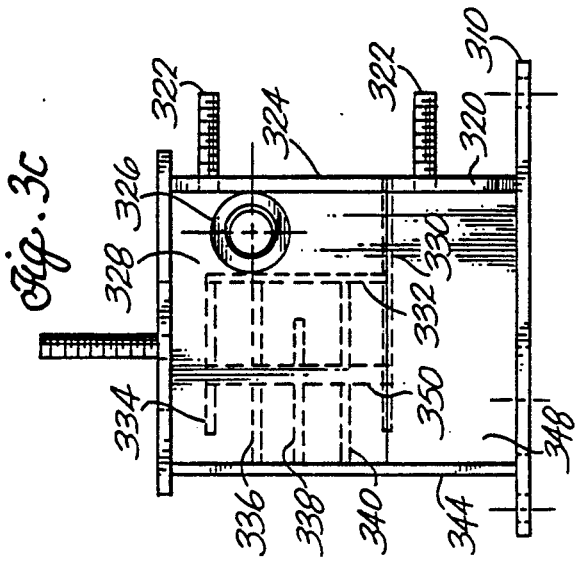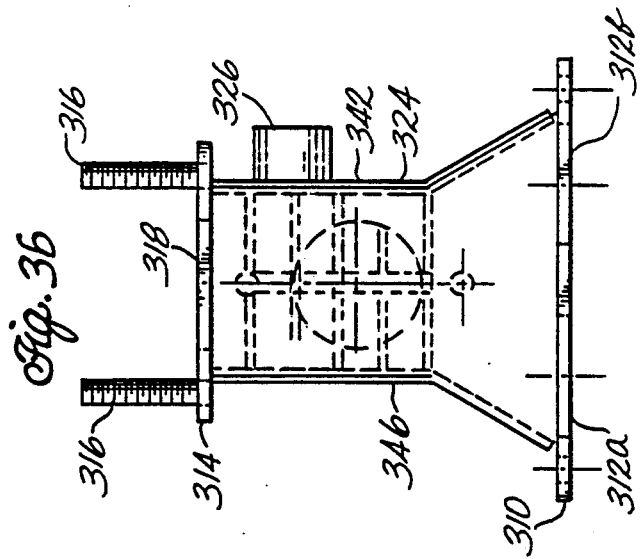

MIXTURE CONTROL UNIT FOR USE WITH THE CONTROL SYSTEM OF A SOIL VENTING APPARATUS

This is a division of application Ser. No. 07/512,305 filed Apr. 20, 1990 now U.S. Pat. No. 5,070,850, issued Dec. 10, 1991.

FIELD OF THE INVENTION

The present invention relates generally to systems for venting and combustion of hydrocarbon vapors present in soil, land fills, and empty storage tanks. More particularly, the invention provides a mixture control system for controlling the flow of vaporized hydrocarbons drawn into an engine for combustion and combining a supplemental fuel with the vaporized hydrocarbons as required to maintain a near stoichiometric mixture.

BACKGROUND OF THE INVENTION

Spills of hydrocarbons into soil, hydrocarbon gases generated by materials in land fills, and residual vapors in empty storage tanks must be extracted and disposed of to prevent environmental impact through air pollution, toxic hazard, or explosion hazard. Typical systems for achieving this end employ vacuum pumps to create a pressure gradient through perforated pipe embedded in the contaminated soil or land fill material, or lines running to an empty storage tank. The vaporized hydrocarbons are drawn through the vacuum pump into a combustion unit where they are eliminated by burning.

An improved system disclosed in U.S. Pat. No. 4,846,134 employs an internal combustion engine which provides vacuum to the system through the intake manifold of the engine. The extracted waste hydrocarbons provide all or some of the fuel for the engine and are destroyed by combustion in the cylinders. This system provides unique advantages in that supplemental power requirements are minimized for operation of the system.

The control system for starting the engine on a supplemental fuel and mixing the extracted vapor with the supplemental fuel for combustion has previously employed manual control. Valves connecting the supplemental fuel and the hydrocarbon vapor source to the engine have been controlled by a human operator to provide optimum mixture of the fuel, comprising the supplemental fuel and hydrocarbon vapors, and air drawn both from the hydrocarbon vapor source and the atmosphere.

Such operation requires trained operators and full time monitoring of the system to provide optimum efficiency. For cost reduction and efficiency improvement, it is desirable to provide a control system for the vapor extraction system which is automated and provides a proper mixture to the engine for most efficient destruction of the hydrocarbons and minimum pollution from the exhaust gases of the engine.

SUMMARY OF THE INVENTION

The present invention provides a control system for an internal combustion engine based vapor extraction and combustion system. The invention employs an engine having a standard gaseous fuel carburetor for initial control of the engine on a supplemental fuel. A mixing chamber is provided to receive the supplemental fuel, vaporized waste hydrocarbons as well as entrained air from a hydrocarbon source, and air received through the carburetor, to ensure appropriate mixing of the charge entering the manifold of the engine. The vaporized hydrocarbons and entrained air, or source gas, from the hydrocarbon source flow through a source gas shutoff valve. The source gas flows from the source valve to a mixture control unit which also is connected to a supplemental fuel tank through a three-way valve which feeds the supplemental fuel from the tank to the gas carburetor or to the mixture control unit. An oxygen sensing system detects oxygen concentration in the exhaust manifold of the engine and a control means responsive to the oxygen concentration adjusts the mixture control unit to supply fuel to the engine from the source gas richened with the supplemental fuel if necessary to provide a near stoichiometric mixture to the engine. A controllable bypass valve is provided from the source gas shutoff valve to the mixing chamber allowing a portion of the source gas to bypass the mixture control unit when the heating value of the source gas becomes low enough that a sufficient volume of gas cannot be provided through the mixture control unit due to flow restrictions within the unit. Control of the bypass valve is responsive to the supplemental fuel flow rate.

Engine speed is controlled by a butterfly valve in the gaseous fuel carburetor controlling air flow from the atmosphere through the carburetor to the intake manifold. A control unit responsive to engine speed adjusts the butterfly valve position thereby governing speed of the engine. Since air may be entrained in the source gas, the controllable bypass valve is also responsive to the speed control unit in a condition when the butterfly valve is closed due to the entrained air in the source gas providing sufficient combustion oxygen through the bypass valve.

Integrated control of the mixture control unit, bypass valve, butterfly valve, and in certain embodiments, the three-way valve and source shutoff valve is accomplished through the use of a microprocessor.

Operation of the system is initiated by positioning the three-way valve allowing supplemental fuel from the tank to feed through the gaseous fuel carburetor to the mixing chamber and intake of the engine for starting. After smooth operation of the engine is achieved, the three-way valve is repositioned to divert the flow of supplemental fuel through the mixture control unit into the mixing chamber. Exhaust oxygen concentration is monitored to provide control input for a controller for the mixing control unit which adjusts the supplemental fuel flow to achieve near stoichiometric operating conditions. The source shutoff valve is then opened allowing source gas to enter the mixture control unit. The hydrocarbons in the source gas richen the mixture provided through the mixture control unit which is sensed in the exhaust gas oxygen concentration. The mixture control unit reduces the supplemental fuel flow to maintain a near stoichiometric mixture. If the heating value of the source is sufficiently high, the mixture control unit will completely eliminate supplemental fuel flow to the engine. Engine speed is controlled through the butterfly valve which is positioned in response to the engine speed.

As the hydrocarbon mixture in the source gas is reduced in heating value providing a leaner mixture to the engine, the mixture control unit will again begin feeding supplemental fuel to the engine. Flow of the supplemental fuel is sensed and control of the bypass valve initiated to produce additional flow of source gas bypassing the mixture control unit and entering the mixing chamber directly. The mixture control unit then provides mixture control by controlling a portion of the source gas flow and the supplemental fuel flow. Continued flow of supplemental fuel results in further opening of the bypass valve until fully open. Engine speed control is maintained through the butterfly valve until sufficient entrained air is provided in the source gas to meet oxygen needs for combustion. When the engine speed governor has closed the butterfly entirely, engine speed control is maintained by controlling the source gas flow through the bypass valve. Mixture control is maintained by the mixture control unit metering supplemental fuel and a portion of the source gas to maintain near stoichiometric mixture in the engine. When the hydrocarbons in the source gas are sufficiently depleted to require operation on supplemental fuel only, the initial operating sequence of the engine may be conducted in reverse to achieve a smooth shut down of the system.

BRIEF DESCRIPTION OF THE DRAWINGS

The advantages and features of the invention may be better understood with reference to the following drawings, detailed description and the appended claims.

FIG. 3a is a top view of the mixing chamber;

FIG. 3b is a right side view of the mixing chamber; and,

FIG. 3c is a front view of the mixing chamber.

DETAILED DESCRIPTION OF THE INVENTION

Figure 1:
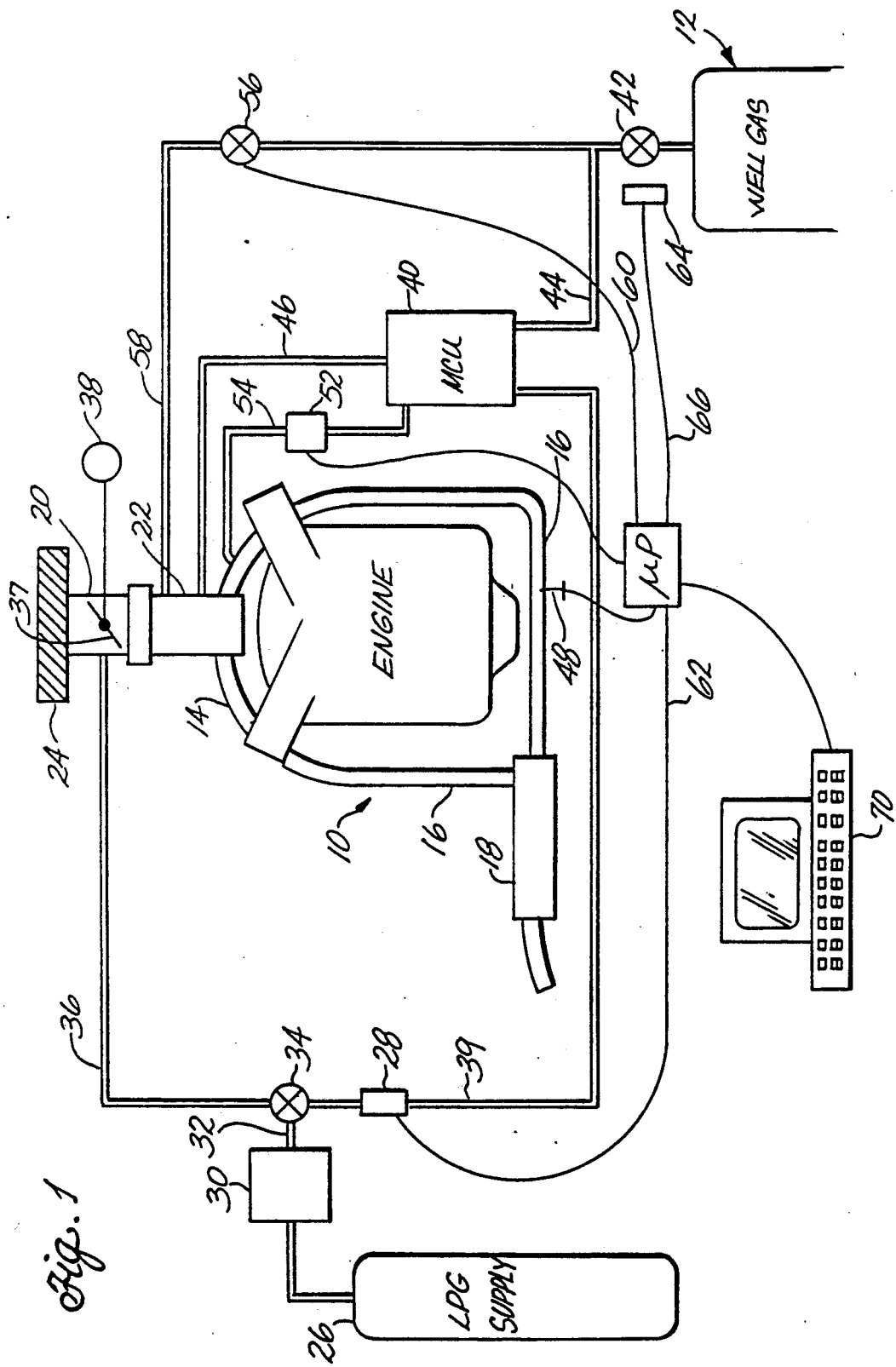
FIG. 1 is a schematic of the engine supplemental fuel supply, source supply, and the mixture control system.

A system employing an internal combustion engine and plumbing system for volatilizing hydrocarbon vapors and combusting them for pollution reduction is disclosed in U.S. Pat. No. 4,846,134 dated July 11, 1989, having a common assignee with the present invention, the disclosure of which is fully incorporated herein by reference. Referring now to the drawings, FIG. 1 shows a schematic representation of an example embodiment of the present invention. An internal combustion engine 10 is used to provide manifold vacuum for volatilizing and aspirating hydrocarbons from a source such as contaminated soil, land fill mass, or an empty storage tank. A generalized source for this gas is designated 12 in FIG. 1. The engine includes a intake manifold 14 and an exhaust manifold 16, a catalytic convertor and muffler system 18 is attached to the exhaust manifold for reducing emissions from the engine exhaust. A carburetor 20 and mixing chamber 22 are connected to the intake manifold for fuel supply to the engine as will be described in greater detail subsequently. Primary combustion air enters the engine through the carburetor via air cleaner 24.

A supplemental fuel is provided for initial operation of the engine and supplementing the combustible hydrocarbons in the source gas as required. In the embodiment shown in FIG. 1, an LPG supply 26 is employed. Gaseous fuels are preferred for use as the supplemental fuel source and may include LPG, propane, methane, compressed natural gas or liquified natural gas. The carburetor is adapted for gaseous fuel use. A flow meter 28 measures fuel flow from the supplemental supply, as will be described in greater detail subsequently. For LPG or other liquified gaseous fuels, a convertor regulator 30 is provided to vaporize and temperature stabilize the fuel as known to those skilled in the art. The vaporized supplemental fuel flowing in the supply line 32 is provided through a three-way valve 34 to a carburetor fuel line 36. With the three-way valve in a first position, supplemental fuel flows through the carburetor fuel line entering the carburetor for mixing with primary combustion air then flowing through the mixing chamber into the intake manifold of the engine. Primary air flow through the carburetor is controlled using a butterfly valve 37. Since the engine operates under no-load conditions, a speed sensor is employed to avoid engine overspeed. An engine speed controller 38 positions the butterfly valve to maintain engine speed for given fuel flow. With the three-way valve positioned in a second position, supplemental fuel flows through supplemental fuel line 39 to a mixture control unit 40 (MCU). The source gas from the contaminated soil, well, tank, or land fill comprising the source 12 is provided through a source gas shutoff valve 42 to a source gas control line 44 connected to the MCU. The MCU then provides the source gas, supplemental fuel or a combination of the two, as will be described in greater detail subsequently, to the mixing chamber through mixture control fuel line 46.

The fuel mixture provided to the engine through the mixing chamber is controlled in the MCU. A mixture sensing means attached to the engine produces a control signal which enables the MCU to adjust the flow of source gas and supplemental fuel as required to provide sufficient fuel to create a near stoichiometric mixture in the mixing chamber. In the embodiment shown in FIG. 1, an oxygen sensor 48 provides the mixture measurement. A controller such as a microprocessor 50 receives the input from the oxygen sensor and provides an output to control the MCU. The microprocessor may be a single integrated unit or a plurality of interconnected units governing separate functions in the overall system. In the embodiment shown, a dithering valve 52 receives the output from the controller to adjust a vacuum level provided to the MCU through vacuum line 54. As will be described in greater detail subsequently, the vacuum level provided to the MCU controls the mixture of the source gas and supplemental fuel supplied through mixture control fuel line 46.

In the embodiment shown in the drawings, the components described are commercially available. The microprocessor is a combination of two units; a first analog processor receiving oxygen level information from the oxygen sensor and providing control output to the dithering valve and a process controller receiving data from and controlling other functions to be described subsequently. The dithering valve is available from Borg Warner, the analog processor is produced by Autotronics Corp. under part number 4045 TMS, the process controller is a Kaye X1510 Process Link with a V222 Analog Scanner, and the oxygen sensor is available from Autotronics Corp. under part number 8945.

Flow of source gas through the MCU is limited. As the heating value of the source gas reduces during depletion of gas from the source, sufficient volume of source gas cannot be passed through the MCU to maintain a near stoichiometric mixture without the use of supplemental fuel. However, if provided in greater volume, sufficient heating value in the source gas exists to operate the engine with minimum use of supplemental fuel, a bypass valve 56 is provided to route source gas through bypass line 58 directly to the mixing chamber.

The volume of source gas provided through bypass line 58 to the mixing chamber includes entrained air from the source. Typically, the source gas is provided from a contaminated soil, a fuel tank undergoing inerting, or a land fill, each of which contains significant amounts of oxygen or allows air to be drawn through the system. Consequently, as bypass valve 56 is opened and source gas is provided to the mixing chamber, a reduction in primary air will be needed to maintain engine speed. The engine speed sensor and associated control for the carburetor butterfly valve performs this function until the butterfly valve has been completely closed. When the butterfly valve has been closed, the bypass valve is controlled to maintain engine speed.

In the embodiment shown in FIG. 1, the bypass valve is controlled by the microprocessor and may employ a standard solenoid operated valve or other electrically controllable valve as known to those skilled in the art. The electrical bypass control line 60 is shown in FIG. 1. The microprocessor initiates opening the bypass valve during operation of the engine when the MCU begins adding supplemental fuel to racine the mixture. The microprocessor senses supplemental fuel flow through flow meter 28 on control line 62. As will be described in greater detail subsequently, operation of the engine requires starting on the supplemental fuel. Consequently, to avoid opening of the bypass valve prematurely, a source gas flow switch 64 is provided to sense complete opening of the source shutoff valve 42. The source gas flow switch shown in the embodiment in FIG. 1 is a separate manually operated switch connected to the microprocessor through control line 66 which is engaged upon complete opening of the source gas shutoff valve by the operator. An automatic contacting switch sensing the fully open position of the source gas shutoff valve or a flow rate sensor for the source gas could be employed as replacements for the manual source gas flow switch. The microprocessor inhibits control of the bypass valve unless the source gas flow switch is engaged.

A general purpose computer 70 is interfaced to the microprocessor in the embodiment shown in FIG. 1 to provide data recording and external communication capability for the system. A standard personal computer available from numerous sources may be employed with appropriate communications interfaces.

Figure 2:
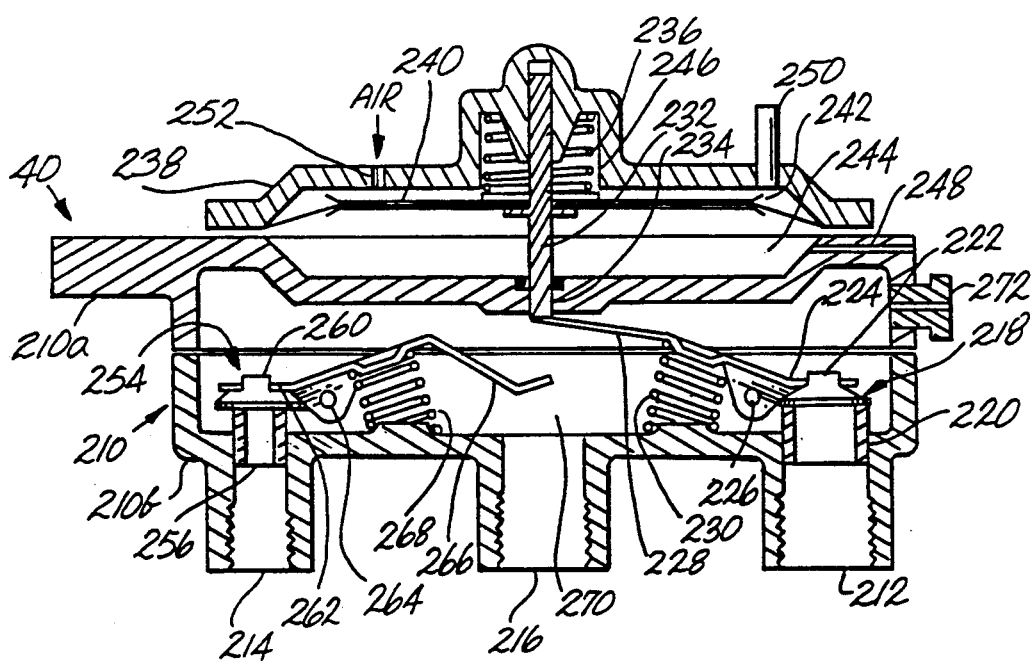
FIG. 2 is a side view cutaway of the mixture control unit.

Referring now to FIG. 2, a detailed drawing of the mixture control unit of a present embodiment is provided. The mixture control unit includes a body 210 which in the embodiment shown comprises an upper casting 210A and a lower casting 210B. The mixing unit receives the source gas from source control line 44 of FIG. 1 through aperture 212. Supplemental fuel is received by the mixture control unit from supplemental fuel line 39 of FIG. 1 through a second aperture 214. The fuel mixture of source gas and supplemental fuel flows from the mixing control unit into mixture control fuel line 46 through a third aperture 216. In the embodiment shown, each of the apertures comprises an internally threaded nipple for receiving a threaded fitting attaching the various fuel lines. The source gas flows through a first valve 218 having a seat 220 surrounding the aperture and engaging a valve cap 222. The valve cap is mounted to an arm 224 which is in turn pivotally supported through pin 226 allowing the valve cap to be rotated off the valve seat. A lever 228 extending from the arm opposite the pivot pin 226 engages a first spring 230 urging the lever upwards to rotate the arm downwards about pin 226 to seat valve cap 222. A plunger 232 extending through an orifice 234 in the upper casting engages the lever urging it downwards through reaction of a bonnet spring 236. A bonnet casting 238 constrains the bonnet spring and forms a vacuum chamber in combination with the upper body casting. A diaphragm 240 separates the vacuum chamber into an upper chamber 242 and a lower chamber 244. A washer 246 connects the spring, plunger and diaphragm. A first air bleed 248 maintains atmospheric pressure in the lower chamber. Vacuum is applied through a vacuum port 250 extending through the bonnet into the upper chamber. A bleed air port 252 provides equalizing pressure for the upper chamber allowing the diaphragm to reposition upon removing vacuum from the vacuum port. The diaphragm moves through a range from a first position with maximum vacuum on the upper chamber through an intermediate position, essentially undeformed horizontally, to a second position with minimum vacuum on the upper chamber.

With no vacuum present, the bonnet spring 236 forces the diaphragm and washer downwardly, moving the plunger through the orifice in the upper casting to depress the lever 228 of the first valve assembly. A second valve assembly 254 is provided for the supplemental fuel input aperture having similar components to the first valve including a valve seat, 256, valve cap 260, second arm 262, second pivot pin 264 and second lever 266. A second spring 268 engages the second lever urging the second lever upwardly, rotating the second arm about the second pivot pin to close the second valve cap on the second valve seat. The second lever is configured as shown in FIG. 2 with a downward angle placing the second lever below the first lever to be engaged by the plunger after the first valve is completely open. With the second spring 236 in the fully extended position driving the diaphragm, washer, and plunger to the second or downward most position, the first and second valves are both fully open. The application of maximum vacuum to the upper chamber causes the diaphragm to deform to the first or upward most position. Intermediate vacuum levels placing the diaphragm in a range between the first position and intermediate position, position the plunger to control the first valve between a fully closed and fully open position. Intermediate vacuum levels placing the diaphragm in a range between the intermediate position and the second position, position the plunger to control the second valve between a fully closed and fully open position. Incremental changes in vacuum between the maximum and minimum levels allows smooth operation of both valves through a continuous range. Source gas flowing through the first valve and supplemental fuel flowing through the second valve intermix in the central chamber 270 of the MCU body flowing to the main fuel line through aperture 216.

As shown in FIG. 2, for an embodiment employing LPG as the supplemental fuel the diameter of the aperture and valve for the source gas exceeds the diameter of the aperture and valve for the supplemental fuel. Larger diameters in the source gas valve are required to accommodate the relatively lower heating value of the source gas with respect to the supplemental fuel.

An air mixing bleed port 272 is provided into the central chamber in the body of the MCU to accelerate gas mixing and transport from the MCU to the mixing chamber by increased volume flow. Reducing diameter and length of the main fuel line from the MCU to the mixing chamber reduces lag time in transmission of fuel from the MCU to the engine to avoid over-controlling or oscillatory instability.

Vacuum is provided to the MCU from the manifold of the engine through a dithering vacuum valve 52 as described with respect to FIG. 1. In the embodiment shown, the dithering valve employs pulse code modulation (PCM) to provide a relative duty cycle and consequent vacuum level in the upper chamber of the bonnet proportional to the rich or lean composition of the fuel air mixture as determined by the oxygen sensor present in the exhaust manifold of the engine. As previously described, a microprocessor receiving data from the oxygen sensor representative of the overall mixture level provides output to the dithering valve which in turn provides control for the MCU.

As previously described, the engine is started using supplemental fuel with the three-way valve providing the gaseous supplemental fuel directly to the standard gaseous carburetor on the engine. When the engine is warm and the oxygen sensor is hot enough to operate normally, the three-way valve is repositioned to provide the supplemental fuel through the MCU. Control of the three way valve may be manual or under control of the microprocessor. A temperature sensor or other means to verify sufficient engine warm-up for operation of the oxygen sensor is required for input to the microprocessor prior to actuating the three-way valve. During startup and warming of the engine, the standard gaseous carburetor provides the appropriate fuel mixture to the engine. A lean mixture is supplied by the carburetor to provide an optimum operating point for initiation of MCU control. Once the oxygen sensor begins providing control output to the microprocessor, the dithering valve begins operation under the command of the microprocessor supplying vacuum to the MCU.

Supplemental fuel flow is transferred from the gaseous carburetor to the MCU by operation of the three-way valve. Prior to operation of the valve, sensing of a lean mixture results in commands by the microprocessor to decrease the vacuum applied to the diaphragm allowing air entering the bleed port 252 to force the diaphragm downwardly, positioning the plunger to open both valves in the MCU. As supplemental fuel is introduced into the MCU, a rich mixture is sensed and increased vacuum will be applied to the MCU until the second valve assembly controlling flow from the supplemental fuel source is adjusted to reduce the opening to provide a near stoichiometric mixture flowing from the MCU to the mixing chamber.

Source gas is introduced to the MCU by opening the source shutoff valve. Introduction of source gas into the MCU will typically result in an richened mixture as sensed by the oxygen sensor resulting in a command from the microprocessor to the dithering valve for increased vacuum. The vacuum applied to the upper chamber acts to pull the diaphragm, and consequently the plunger, upwardly opposing the bonnet spring. As the plunger moves up, the supplemental fuel valve is closed and mixture control by the MCU is achieved by motion of the plunger responsive to the vacuum applied to the diaphragm allowing the first valve controlling the source gas entering the MCU to open and close proportionate to the movement of the plunger.

As previously described, if the heating value of the source gas being provided decreases, the engine begins to run lean and the exhaust gas oxygen concentration increases. This leaner mixture sensed by the microprocessor results in a command to the dithering valve to decrease vacuum applied to the diaphragm causing the plunger to move downwardly until the valve for the source gas is completely open and the plunger begins to actuate the second valve adding supplemental fuel to the mixture.

Automatic control of engine speed is accomplished using a governor controlling the butterfly valve of the gaseous carburetor as previously described. In the embodiment shown, the governor measures engine speed through a magnetic pick up attached to the fly wheel of the engine. Alternatively, sensing of ignition or spark control may be used for determining the engine speed. If engine speed decreases, the governor opens the butterfly valve slightly admitting more outside air to the engine. If engine speed increases, the governor closes the butterfly valve admitting less outside air. The engine governor may be a direct speed sensor control to the butterfly valve or may be routed through the microprocessor by providing the speed signal to the microprocessor which in turn provides a voltage control for positioning of the butterfly valve by a servo motor. As previously described since the source gas oxygen level may rise as a result of entrained air in the source, speed control of the engine through the butterfly valve is essential.

With the source gas shutoff valve indicator switch engaged indicating the source gas shutoff valve fully open, initiation of supplemental fuel flow through the second valve in the MCU will result in a flow indication through flow meter 28 of FIG. 1. To increase the flow of source gas to the mixing chamber with the first valve of the MCU entirely open, the microprocessor commands the bypass valve 56 to open allowing source gas to flow directly through fuel line 58 to the mixing chamber. As previously described, engine speed control is accomplished through both the butterfly valve and controllable bypass valve as entrained oxygen level in the source gas increases. In a condition of depletion of the heating value of the source gas to a level wherein the bypass valve is completely open and controlling engine speed, further mixture richening is achieved by continued opening of the second valve in the MCU allowing supplemental fuel to flow to the engine. In the embodiment shown, a selected duty cycle for the dithering valve provides an indication of maximum desirable supplemental fuel flow indicating effectively complete depletion of the hydrocarbons in the source gas. In the present embodiment, a 60% duty cycle has been chosen to provide sufficient operating band width for the dithering valve through the mixture range desired. When a 60% duty cycle is reached on the dithering valve under command of the microprocessor, the system is in a condition for shutdown.

FIGS. 3a, 3b, and 3c demonstrate a present embodiment for the mixing chamber. The mixing chamber provides for mixing of outside air received through the carburetor, source gas with entrained air in some quantity received through the bypass valve, and a control fuel mixture comprising source gas and supplemental fuel as required received from the MCU. The mixing chamber provides a flange 310 for attachment to the intake manifold of the engine. As best seen in FIGS. 3a and 3b, two apertures, 312A and 312B, are provided for interfacing with the intake manifold. Aperture size, number and arrangement will depend on the internal combustion engine employed in the system. A top flange 314 as best seen in FIG. 3b is provided with mounting bolts 316 for attachment of the gaseous carburetor. A single aperture 318 is provided in the top plate for fuel and air flow from the carburetor to the mixing chamber. As best seen in FIGS. 3b and 3c, the back plate of 320 of the mixing chamber is provided with attachment bolts 322 for fitting attachment from the bypass fuel line 58. An aperture 324 is provided in the back plate for flow of the bypass source gas into the mixing chamber. A side port 326 is provided to receive the fuel mixture from the MCU.

Internal baffles divide the mixing chamber into a fuel receiving volume, a swirl chamber and a manifold supply plenum. The fuel receiving volume 328 is formed by a bottom baffle 320 welded to the back plate below the bypass source gas entrance aperture, a vertical baffle 332 extending upwardly from the bottom baffle, and a top baffle 334 extending forwardly from the vertical baffle. Each of these baffles is sealed to the right and left side walls.

The swirl chamber is formed by an upper intermediate baffle 336 sealingly attached to the vertical baffle and sealed to the right side wall 342 and front wall 344, a center baffle 338 sealingly attached to the right side wall, front wall and left side wall 346, and a lower intermediate baffle 340 sealingly attached to the front wall, left side wall and vertical baffle. The baffle arrangement as described provides a clockwise rotating series of rectangular apertures formed by the baffles, forcing air entering through the top aperture of the mixing chamber to swirl and mix with fuel comprising supplemental fuel received from the carburetor with the primary air, mixture control fuel, and source gas with entrained air received in the receiving volume of the mixing chamber. A plenum 348 beneath the bottom baffle receives the mixed fuel air charge to be drawn into the intake manifold through apertures 312A and 312B. In the embodiment shown, a rod 350 interconnects the baffles for structural strength and for manufacturing considerations. In the embodiment shown, sealing of the baffles is accomplished by welding.

The mixing chamber shown in the drawings is a rectangular weldment. A casting or other forming method with modification of the shape or planform may be used to create the mixing chamber elements.

Having now described the invention in detail as required by the patent statutes, those skilled in the art will have no difficulty in modifying the elements of the invention to meet specific needs. Such modifications are within the intent and scope of the invention as defined in the following claims.

What is claimed is:

1. A mixture control unit to vary the amount and combination of a source gas, and a supplemental fuel to provide a mixture control fuel to an internal combustion engine, the mixture unit comprising:
    a body having an internal chamber and further having an outlet aperture from the chamber,
    a first valve for introducing source gas into the chamber, the first valve having a range of motion from fully closed to fully open,
    a second valve for introducing supplemental fuel into the chamber, the second valve having a range of motion from fully closed to fully open,
    a bonnet attached to the body forming a second chamber between the body and bonnet,
    a diaphragm bisecting the second chamber to form an upper chamber and a lower chamber,
    the diaphragm having a range of motion from a first position through an intermediate position to a second position responsive to a vacuum level applied to the vacuum port,
    means connecting the diaphragm to the first controllable valve,
    the connection means positioning the first controllable valve from the fully closed position to the fully open position responsive to position of the diaphragm between the first position and intermediate position,
    the connection means connecting the diaphragm to the second controllable valve to position the second controllable valve from the fully closed position to the fully open position proportional to the position of the diaphragm between the intermediate position, and second position, resilient means urging the diaphragm into the second position.

2. A mixture control unit for use with an internal combustion engine connected to vaporize and burn waste hydrocarbons from a source gas, the mixture control unit receiving the source gas and a supplemental fuel for combination as a mixture control fuel, the mixture control unit comprising:
    a body having an internal chamber,
    first aperture through the body into the chamber,
    a first valve seat surrounding the first aperture,
    a first valve cap adapted to engage the first valve seat,
    a first arm pivotally attaching the valve cap to a first pin whereby the valve cap may rotate from a first fully closed position engaging the first seat to a second fully open position,
    a first lever extending from the first arm opposite the pivot pin,
    a first spring engaging the lever urging rotation about the pivot pin to the fully closed position,
    a second aperture through the body into the chamber for introduction of the supplemental fuel,
    a second valve seat surrounding the second aperture,
    a second valve cap adapted to engage the second valve seat,
    a second arm connected to the second valve cap to allow pivotal rotation about a second pin to rotate the second cap from a fully closed position engaging the second valve seat to a fully open position,
    a second lever extending from the second arm opposite the second pivot pin,
    a second spring engaging the second lever to urge the second valve cap to the fully closed position,
    a bonnet enclosing a vacuum chamber,
    a diaphragm bisecting the vacuum chamber into an upper and lower chamber,
    the diaphragm having a range of motion from a first position through an intermediate position to a second position,
    a vacuum port in the bonnet connecting the upper chamber to a controllable vacuum source,
    a third spring urging the diaphragm to the second position,
    a plunger connected to the diaphragm,
    the plunger engaging the first lever against the urging of the first spring to rotate the lever about the first pivot pin through the range of motion of the diaphragm from the first position to the intermediate position,
    the plunger engaging the second lever to rotate the second lever about the second pivot pin against the urging of the second spring through the range of motion of the diaphragm from the intermediate position to the second position.

* * * * *